US011886807B2

(12) United States Patent
Yeun et al.

(10) Patent No.: US 11,886,807 B2
(45) Date of Patent: Jan. 30, 2024

(54) METHOD AND SYSTEM TO PROVIDE OBJECT FOR CONTENT ARRANGEMENT

(71) Applicant: NAVER Corporation, Seongnam-si (KR)

(72) Inventors: TaeSeung Yeun, Seongnam-si (KR); Taewan Kim, Seongnam-si (KR); JunHo Noh, Seongnam-si (KR); Jehyun Park, Seongnam-si (KR); Junyoung Jang, Seongnam-si (KR); Chang Yul Choi, Seongnam-si (KR); Sang Hee Im, Seongnam-si (KR); Sung A Kwon, Seongnam-si (KR); Mihyun Kim, Seongnam-si (KR); Seung Min Lee, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 0 days.

(21) Appl. No.: 17/535,756

(22) Filed: Nov. 26, 2021

(65) Prior Publication Data
US 2022/0164529 A1 May 26, 2022

(30) Foreign Application Priority Data

Nov. 25, 2020 (KR) .......................... 10-2020-0159948

(51) Int. Cl.
*G06F 40/186* (2020.01)
*G06F 40/106* (2020.01)
*G06F 3/0482* (2013.01)

(52) U.S. Cl.
CPC .......... *G06F 40/186* (2020.01); *G06F 3/0482* (2013.01); *G06F 40/106* (2020.01)

(58) Field of Classification Search
CPC ..... G06F 40/186; G06F 40/106; G06F 3/0482
See application file for complete search history.

(56) References Cited

U.S. PATENT DOCUMENTS

| 5,354,948 A * | 10/1994 | Toda ........................ G10H 7/00 84/625 |
| 9,285,977 B1 * | 3/2016 | Greenberg ......... G06Q 30/0643 |
| 10,282,393 B2 * | 5/2019 | Baldwin ............... G06F 16/972 |
| 11,334,642 B2 * | 5/2022 | Weng ................... G06F 16/958 |
| 2001/0011287 A1 * | 8/2001 | Goto ..................... G06F 40/117 715/235 |
| 2001/0040592 A1 * | 11/2001 | Foreman ............... G11B 27/34 375/E7.189 |

(Continued)

FOREIGN PATENT DOCUMENTS

| KR | 10-2007-0076218 A | 7/2007 |
| KR | 10-2015-0071260 A | 1/2016 |

(Continued)

OTHER PUBLICATIONS

Korean Office Action dated Dec. 16, 2021 issued in corresponding Korean Patent Application No. 10-2020-0159948.

*Primary Examiner* — Shahid K Khan
(74) *Attorney, Agent, or Firm* — Harness, Dickey & Pierce, P.L.C.

(57) ABSTRACT

Disclosed is a method and system for providing an object for content arrangement. A content arrangement method includes providing a cue card list that is a card-type dedicated object for content arrangement; and arranging a content set in a card unit using a cue card selected from the cue card list.

20 Claims, 13 Drawing Sheets

(56) References Cited

U.S. PATENT DOCUMENTS

| | | | | |
|---|---|---|---|---|
| 2002/0059313 | A1* | 5/2002 | Yoon | H04L 65/611 |
| 2004/0039934 | A1* | 2/2004 | Land | G11B 27/34 |
| 2006/0067578 | A1* | 3/2006 | Fuse | G09B 5/067 |
| | | | | 382/203 |
| 2006/0111971 | A1* | 5/2006 | Salesin | G06Q 30/02 |
| | | | | 705/14.49 |
| 2006/0156228 | A1* | 7/2006 | Gallo | G06F 3/0483 |
| | | | | 345/581 |
| 2007/0079236 | A1* | 4/2007 | Schrier | G06F 40/114 |
| | | | | 715/209 |
| 2007/0082707 | A1* | 4/2007 | Flynt | G06Q 30/0261 |
| | | | | 455/564 |
| 2007/0277245 | A1* | 11/2007 | Goto | G11B 27/105 |
| | | | | 375/E7.009 |
| 2007/0294238 | A1* | 12/2007 | Citron | G06F 40/186 |
| 2008/0104624 | A1* | 5/2008 | Narasimhan | H04N 21/4667 |
| | | | | 725/24 |
| 2008/0155459 | A1* | 6/2008 | Ubillos | G11B 27/034 |
| | | | | 715/783 |
| 2008/0172608 | A1* | 7/2008 | Patrawala | G06F 16/958 |
| | | | | 715/255 |
| 2010/0088605 | A1* | 4/2010 | Livshin | G06F 40/103 |
| | | | | 715/731 |
| 2012/0233550 | A1* | 9/2012 | Zimmon | G06F 16/958 |
| | | | | 715/744 |
| 2012/0278704 | A1* | 11/2012 | Ying | G06F 40/143 |
| | | | | 715/243 |
| 2013/0024757 | A1* | 1/2013 | Doll | G06F 40/143 |
| | | | | 715/204 |
| 2013/0144692 | A1* | 6/2013 | Shalabi | G06F 40/186 |
| | | | | 715/249 |
| 2013/0305144 | A1* | 11/2013 | Jackson | G06F 40/114 |
| | | | | 715/246 |
| 2014/0033018 | A1* | 1/2014 | Pallai | G06F 16/972 |
| | | | | 715/234 |
| 2014/0108436 | A1* | 4/2014 | Vishria | G06F 16/9535 |
| | | | | 707/769 |
| 2014/0108922 | A1* | 4/2014 | Gravity | G06F 40/186 |
| | | | | 715/246 |
| 2014/0129910 | A1* | 5/2014 | Kota | G06F 40/103 |
| | | | | 715/202 |
| 2014/0229836 | A1* | 8/2014 | Young | H04N 21/4312 |
| | | | | 715/721 |
| 2014/0258841 | A1* | 9/2014 | Strong | G06F 40/14 |
| | | | | 715/234 |
| 2014/0298218 | A1* | 10/2014 | Gera | G06F 3/0481 |
| | | | | 715/765 |
| 2014/0331124 | A1* | 11/2014 | Downs | G06F 40/106 |
| | | | | 715/243 |
| 2014/0380229 | A1* | 12/2014 | Volodin | G06F 40/103 |
| | | | | 715/780 |
| 2015/0007022 | A1* | 1/2015 | Chen | G06F 16/958 |
| | | | | 715/753 |
| 2015/0058754 | A1* | 2/2015 | Rauh | H04N 1/00 |
| | | | | 715/753 |
| 2015/0066637 | A1* | 3/2015 | Herrera | G06Q 50/01 |
| | | | | 705/14.45 |
| 2015/0113386 | A1* | 4/2015 | Wu | G06F 40/131 |
| | | | | 715/243 |
| 2015/0242374 | A1* | 8/2015 | Kong | G06F 40/106 |
| | | | | 715/201 |
| 2015/0248423 | A1* | 9/2015 | Christolini | G06F 40/186 |
| | | | | 715/202 |
| 2016/0179976 | A1* | 6/2016 | Piesche | G06F 40/186 |
| | | | | 715/234 |
| 2016/0253683 | A1* | 9/2016 | Gui | G06Q 50/01 |
| | | | | 705/7.32 |
| 2016/0275067 | A1* | 9/2016 | Mei | G06F 40/106 |
| 2016/0337299 | A1* | 11/2016 | Lane | H04L 67/10 |
| 2020/0334019 | A1* | 10/2020 | Bosworth | G06F 8/34 |

FOREIGN PATENT DOCUMENTS

| | | |
|---|---|---|
| KR | 10-2017-0019402 A | 6/2017 |
| KR | 10-2019-0020259 A | 4/2019 |
| KR | 10-1993087 B1 | 6/2019 |

* cited by examiner

METHOD AND SYSTEM TO PROVIDE OBJECT FOR CONTENT ARRANGEMENT

CROSS-REFERENCE TO RELATED APPLICATION(S)

This U.S. non-provisional application and claims the benefit of priority under 35 U.S.C. § 119 to Korean Patent Application No. 10-2020-0159948, filed Nov. 25, 2020, the entire contents of which are incorporated herein by reference in their entirety.

BACKGROUND

Technical Field

One or more example embodiments relate to technology for arranging contents on a service screen.

Related Art

An Internet service may provide a service screen in which various types of contents are included through a web or an application. The contents in the service screen may be arranged in a predetermined template according to service contents.

As an example of technology for providing a service screen, technology for providing content information configured using a plurality of categories is known.

SUMMARY

One or more example embodiments provide methods and/or systems that may provide an administration (admin) tool for content arrangement.

One or more example embodiments provide methods and/or systems that may produce a content set in a card-type object unit and may arrange contents.

One or more example embodiments provide methods and/or systems that may automatically arrange contents using an object including an automatic editing element.

According to an aspect of at least one example embodiment, there is provided a content arrangement method performed by a computer apparatus including at least one processor configured to execute computer-readable instructions included in a memory. The content arrangement method may include, by the at least one processor, providing a cue card list that is a card-type dedicated object for content arrangement, and arranging a content set in a card unit using a cue card selected from the cue card list.

The cue card may include at least one editing element associated with content arrangement.

The cue card may include at least one template for content arrangement according to a type of the cue card.

The arranging may include mapping the content set to the cue card, is the content set having been selected based on a content consumption pattern of each user for each user using an Internet service according to a type of the cue card.

The arranging may include mapping the content set to the cue card, is the content set having been selected based on ranking data by content consumption of all users using an Internet service according to a type of the cue card.

The arranging may include mapping the content set to the cue card, the content set associated with a keyword input or selected by an administrator according to a type of the cue card.

The arranging may include converting content provided from a content provider to data in a common format, and mapping data of each content included in the content set to a template of the cue card.

The content arrangement method may further include, by the at least one processor, displaying the cue card in which the content set is arranged on at least one service area.

The content arrangement method may further include, by the at least one processor, changing a position of the cue card that is displayed on the service area based on a content consumption pattern of all service users.

The content arrangement method may further include, by the at least one processor, terminating displaying of the cue card based on at least one of a content display time, a content consumption status, and a content consumption amount for the cue card that is displayed on the service area.

The content arrangement method may further include, by the at least one processor, providing an AB test function for experimenting content consumption by setting an experimental condition, the experimental condition including a target characteristic for the cue card in which the content set is arranged.

According to an aspect of at least one example embodiment, there is provided a non-transitory computer-readable record medium storing instructions that when executed by a processor, causes processor computer apparatus to run the aforementioned content arrangement method.

According to an aspect of at least one example embodiment, there is provided a computer apparatus including at least one processor configured to execute computer-readable instructions included in a memory. The at least one processor may be configured to cause the computer apparatus to provide a cue card list that is a card-type dedicated object for content arrangement, and arrange a content set in a card unit using a cue card selected from the cue card list.

According to some example embodiments, it is possible to produce a content set in a card unit by arranging contents using a card-type dedicated object for content arrangement and to display the content set produced in the card unit on a plurality of service areas.

According to some example embodiments, it is possible to reduce or minimize editing effort of an administrator and to arrange desired or optimized contents by providing an object including an automatic editing element as a dedicated object for content arrangement.

Further areas of applicability will become apparent from the description provided herein. The description and specific examples in this summary are intended for purposes of illustration only and are not intended to limit the scope of the present disclosure.

DETAILED DESCRIPTION

Figure 1:
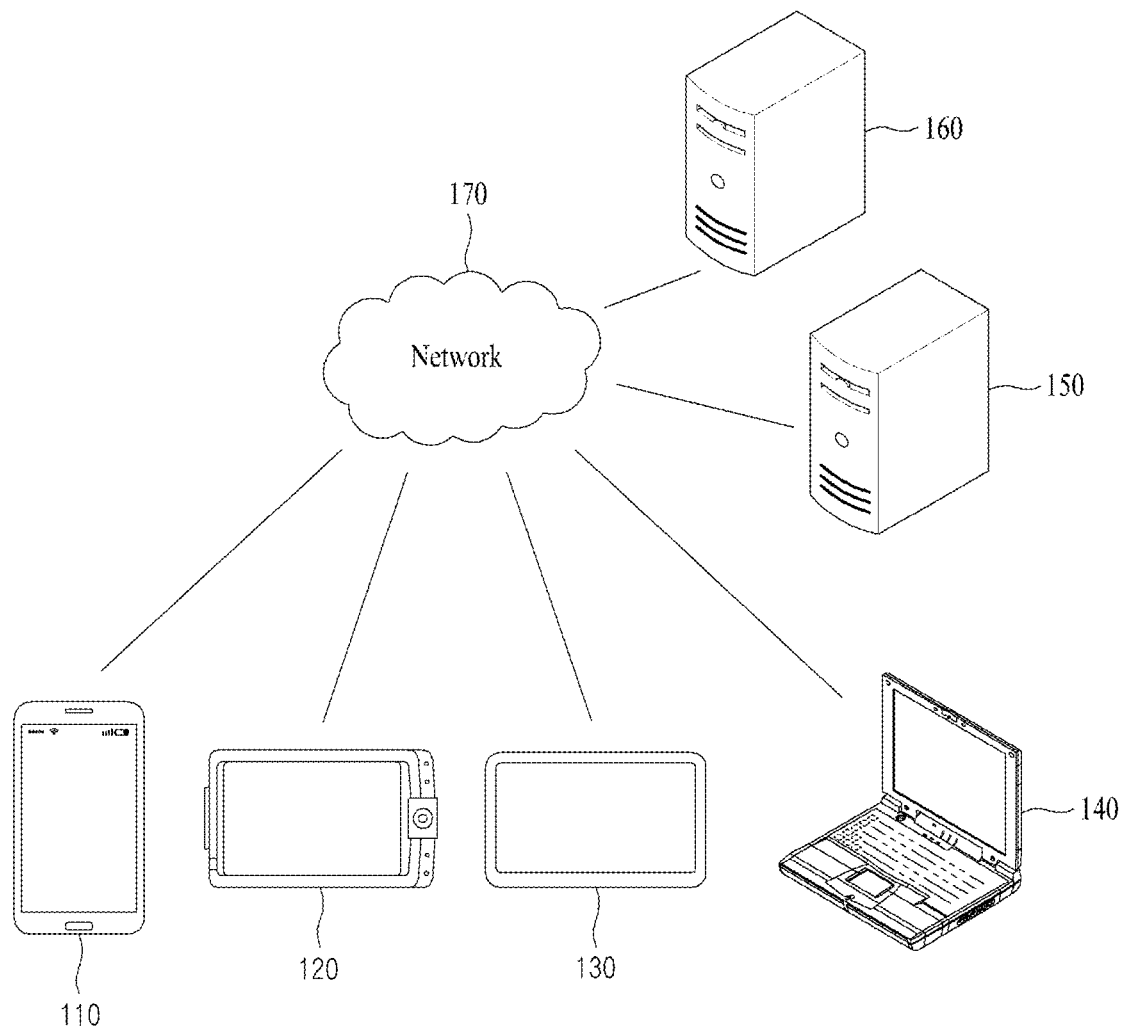
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

The disclosed example embodiments relate to technology for arranging contents displayed on a service screen.

A content arrangement system according to the example embodiments may be implemented by at least one computer apparatus, and a content arrangement method according to the example embodiments may be performed through at least one computer apparatus included in the content arrangement system. Here, a computer program according to an example embodiment may be installed and run on the computer apparatus. The computer apparatus may perform the content arrangement method according to the example embodiments under control of the executed computer program. The computer program may be stored in a non-transitory computer-readable record medium to computer-implement the content arrangement method in conjunction with the computer program.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments. The environments applicable to the example embodiments are not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include a content arrangement management service, a search service, a content providing service, a social network service, a map service, a translation service, and the like.

Figure 2:
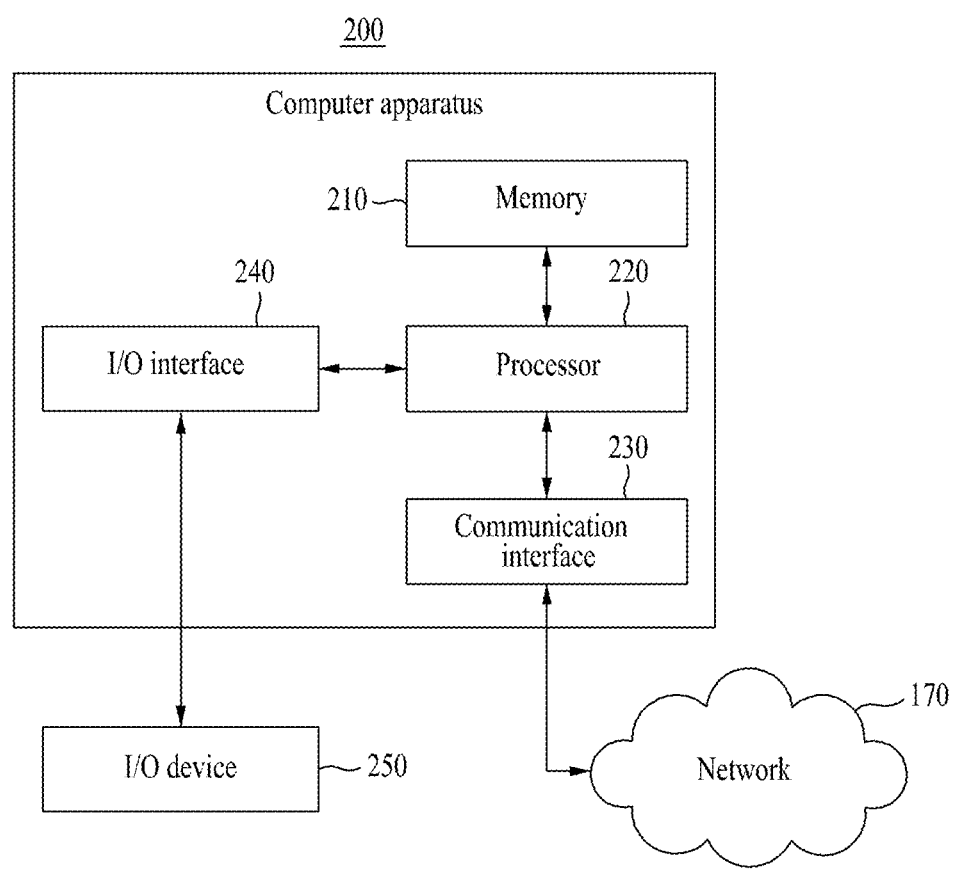
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by the computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include, for example, a floppy drive, a disk, a tape, a DVD/CD-ROM drive, and a memory card. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210. The processor may include a plurality of processors, and at least one or more of the processors may be separate from the computer apparatus and connected to the computer apparatus.

The communication interface 230 may provide a function for communication between the communication apparatus 200 and another apparatus, for example, the aforementioned storage devices. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interface with an I/O device 250. For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. The I/O device 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O device 250, or may further include other components, for example, a transceiver, a database (DB).

Hereinafter, some example embodiments of a method and system for content arrangement are described.

Figure 3:
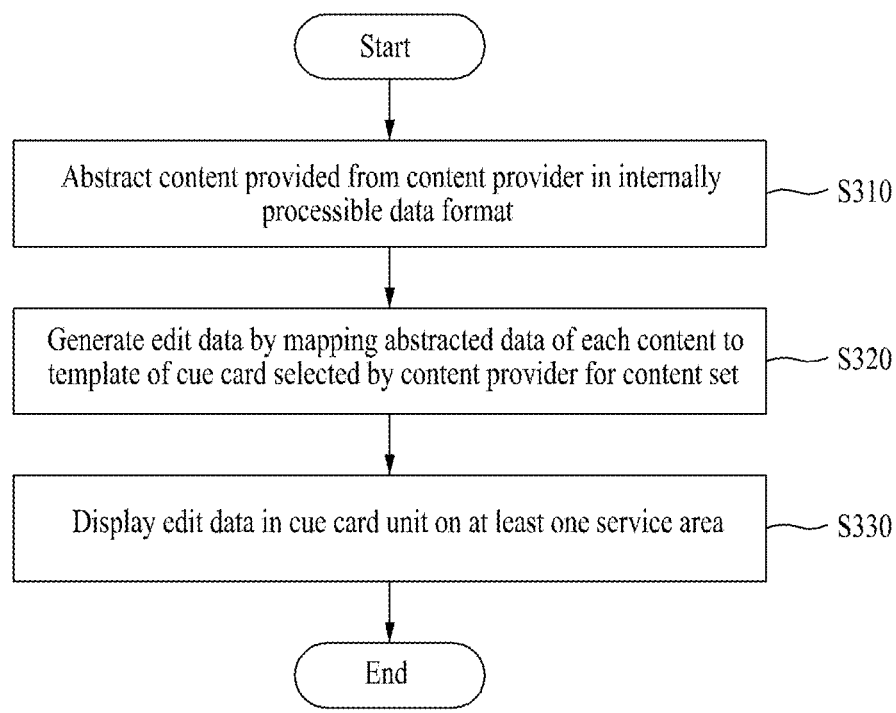
FIG. 3 is a flowchart illustrating an example of a method performed by a computer apparatus according to at least one example embodiment.

FIG. 3 is a flowchart illustrating an example of a method performed by a computer apparatus according to at least one example embodiment.

The computer apparatus 200 according to the example embodiment may provide a client with a management service for content arrangement through connection to a dedicated application installed on the client or a website/mobile site related to the computer apparatus 200. A computer-implemented content arrangement system may be configured in the computer apparatus 200. For example, the content arrangement system may be implemented in a form of a program that independently operates or may be configured in an in-app form of a specific application to run on the specific application.

Referring to FIG. 3, to perform the content arrangement method of FIG. 3, the processor 220 of the computer apparatus 200 may include at least one component. Depending on example embodiments, the components of the processor 220 may be selectively included in or excluded from the processor 220. Also, depending on example embodiments, the components of the processor 220 may be separated or merged for representations of functions of the processor 220.

The processor 220 and the components of the processor 220 may control the computer apparatus 200 to perform operations S310 to S330 included in the content arrangement method of FIG. 3. For example, the processor 220 and the components of the processor 220 may be configured to execute an instruction according to a code of at least one program and a code of an OS included in the memory 210.

Here, the components of the processor 220 may be representations of different functions of the processor 220 performed by the processor 220 in response to an instruction provided from the program code stored in the computer apparatus 200.

The processor 220 may read a desired instruction from the memory 210, to which instructions associated with control of the computer apparatus 200 are loaded. In this case, the read instruction may include an instruction for controlling the processor 220 to perform the following operations S310 to S330.

The following operations S310 to S330 may be performed in order different from order of FIG. 3, and a portion of operations S310 to S330 may be omitted or an additional process may be further included.

The processor 220 provides an administration (admin) tool capable of arranging content to be displayed on a service screen to an administrator of a content provider side that provides content to an Internet service platform. For example, the processor 220 may provide a management service for each media company such that a person in charge in a corresponding media company may edit its own content arrangement according to a content type.

Figure 4:
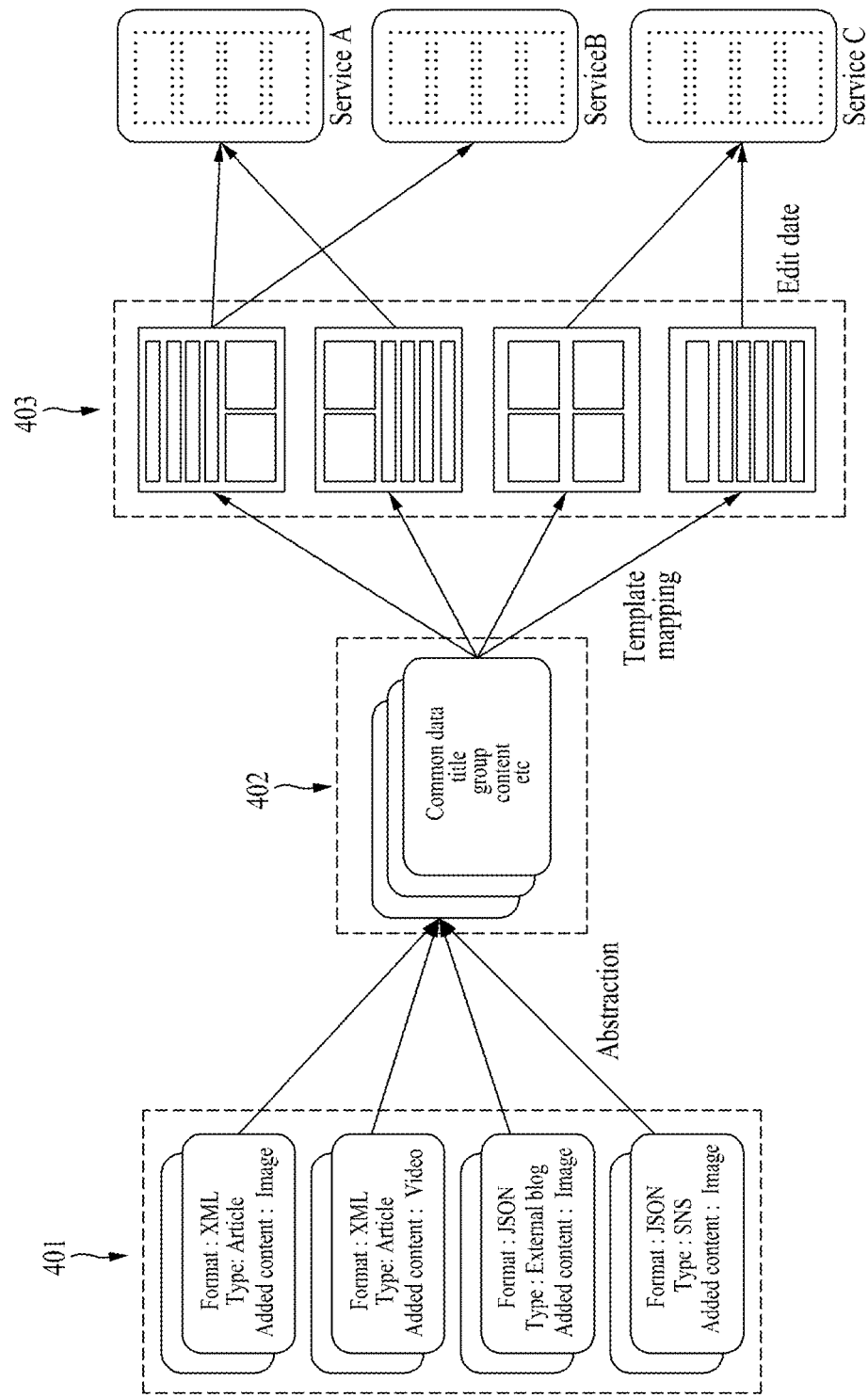
FIG. 4 illustrates an example of a data processing process for content display according to at least one example embodiment.

Referring to FIG. 3, in operation S310, the processor 220 may abstract content provided from a content provided in a data format that may be processed in an Internet service platform. Referring to FIG. 4, the processor 220 may perform abstraction of data to process external data 401 in various formats, such as articles, blogs, posts, etc., inside a platform. The processor 220 may convert main content of original content, for example, a type, a title, and a body of the content to data 402 in a common format. The processor 220 may convert corresponding content to the data 402 in the common format, for example, eXtensible Markup Language (XML), JavaScript Object Notation (JSON), HyperText Markup Language (HTML)+Cascading Style Sheets (CSS), etc., to make content received (e.g., displayed) in various display areas of the Internet service.

In operation S320, the processor 220 may generate edit data 403 in a cue card unit by mapping abstracted data of each content to a template of a cue card selected by an administrator of a content provider side for a content set that includes at least one content. Here, the cue card refers to a card-shaped object as a dedicated object for content arrangement. The admin tool may include a function of providing a cue card list for a cue card selection, a function of providing a template list for each cue card for a template selection of a cue card, and a function of providing a content list arrangeable in a cue card for a content selection. The cue card may include at least one editing element associated with content arrangement and may include at least one different editing element for each cue card. A portion of cue cards may include an automatic editing element to reduce or minimize editing effort of the administrator. The cue card may include a cue card of a manual editing element capable of directly editing all of a template and content and a cue card of an automatic editing element that is automatically filled with a desired or optimized content set. That is, the processor 220 may easily map a content set to various shapes of cue cards using the abstracted data, that is, the data 402 in the common format.

In operation S330, the processor 220 may display the edit data 403 in a cue card unit, that is, the cue card in which the content set is arranged on at least one service area. The processor 220 may display, on a plurality of service pages, the cue card (e.g., the edit data 403), in which arrangement of the content set is completed.

Therefore, the processor 220 provides the admin tool capable of processing the external data 401 in various formats, such as articles, blogs, and posts, to the data 402 in the common format and arranging the data 402 in various card-shaped objects. The administrator may manually or automatically arrange his or her own content on a cue card in various shapes using the admin tool. Here, the content produced using the cue card may be displayed on a plurality of areas of the Internet service.

The cue card that provides convenience of content arrangement is further described as follows.

FIGS. 5 to 13 illustrate examples of describing a cue card for content arrangement according to at least one example embodiment.

Figure 5:
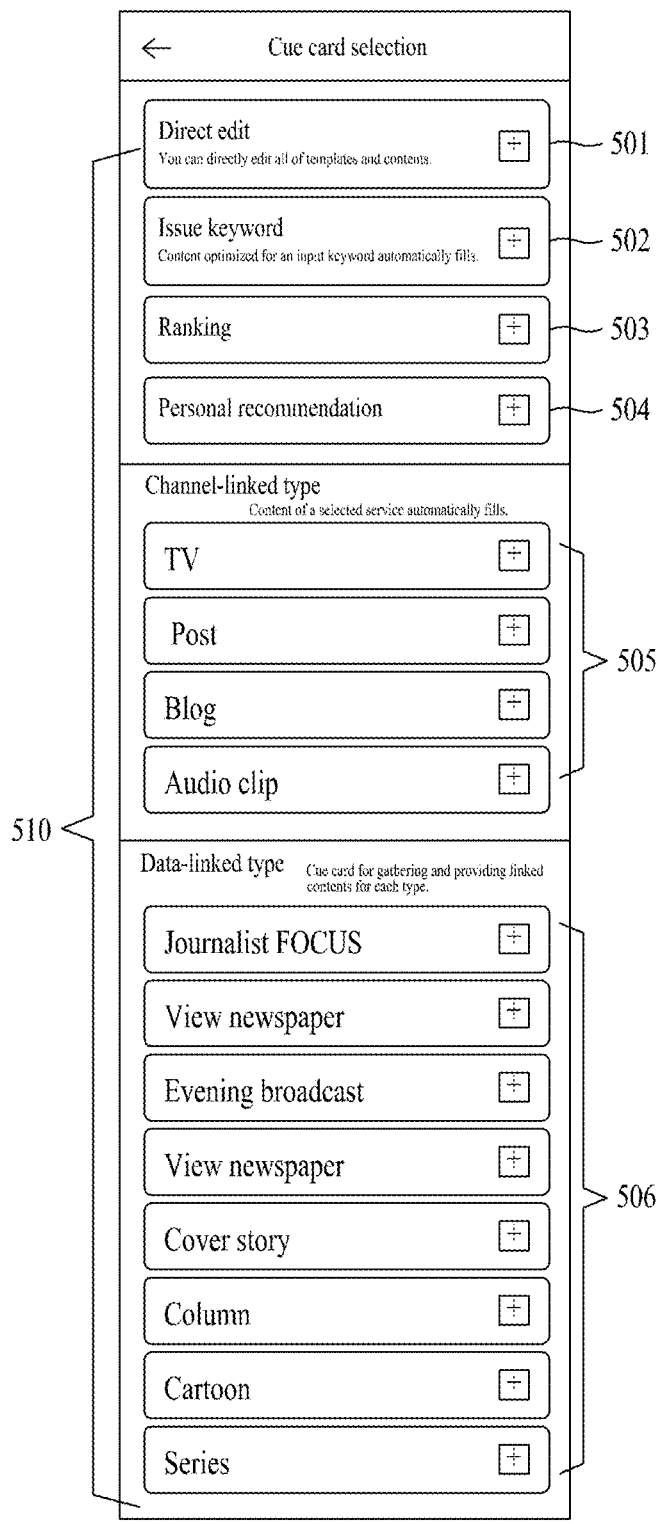
FIGS. 5 to 13 illustrate examples of describing an interface of an administration (admin) tool for content arrangement according to at least one example embodiment.

Referring to FIG. 5, in response to receiving a cue card addition request through a service screen, that is, an admin tool screen of an administrator access authority, the processor 220 provides a cue card selection interface screen 500 for selecting a cue card. The processor 220 provides a cue card list 510 that includes different shapes and editing elements through the cue card selection interface screen 500.

The cue card list 510 may include a direct edit cue card 501 that allows an administrator to directly edit all of a template and content, a keyword cue card 502 in which contents desired or optimized for a keyword input from the administrator are automatically arranged, a ranking cue card 503 in which ranking data according to content consumption of users is applied, a personal recommendation cue card 504 in which contents desired or optimized for an individual user are automatically arranged, a channel-linked cue card 505 in which contents of each channel is automatically arranged in linkage with a service channel, and a data-linked cue card 506 in which linked contents are automatically arranged for each type.

In the keyword cue card 502, a keyword-related content set, for example, a content set that includes a keyword or a content set of a type related to the keyword may be automatically arranged based on a keyword directly input from the administrator or a keyword selected by the administrator from among issue keywords recommended by a system.

In the ranking cue card 503, a content set automatically selected based on ranking data that is generated based on content consumption of the entire users may be arranged. The ranking data may be generated based on various criteria such as a number of reads, a number of comments, feedback (likes, etc.), age, gender, etc., according to content consumption. In the ranking cue card 503, a content set aggregated based on criteria selected by the administrator, for example, content viewed by many users and content with many comments may be automatically arranged.

In the personal recommendation cue card 504, a content set automatically selected according to a personal content consumption pattern of a user may be arranged. The personal content consumption pattern of the user may be analyzed. Here, in the personal recommendation cue card 504, a recommendation content set personalized for a corresponding user may be automatically arranged in the entire content pools or in a content pool selected by the administrator based on the personal content consumption pattern of the user.

For at least a portion of cue cards included in the cue card list 510, a template shape and a number of arrangeable contents for content arrangement may be determined or predetermined for each cue card.

Figure 6:
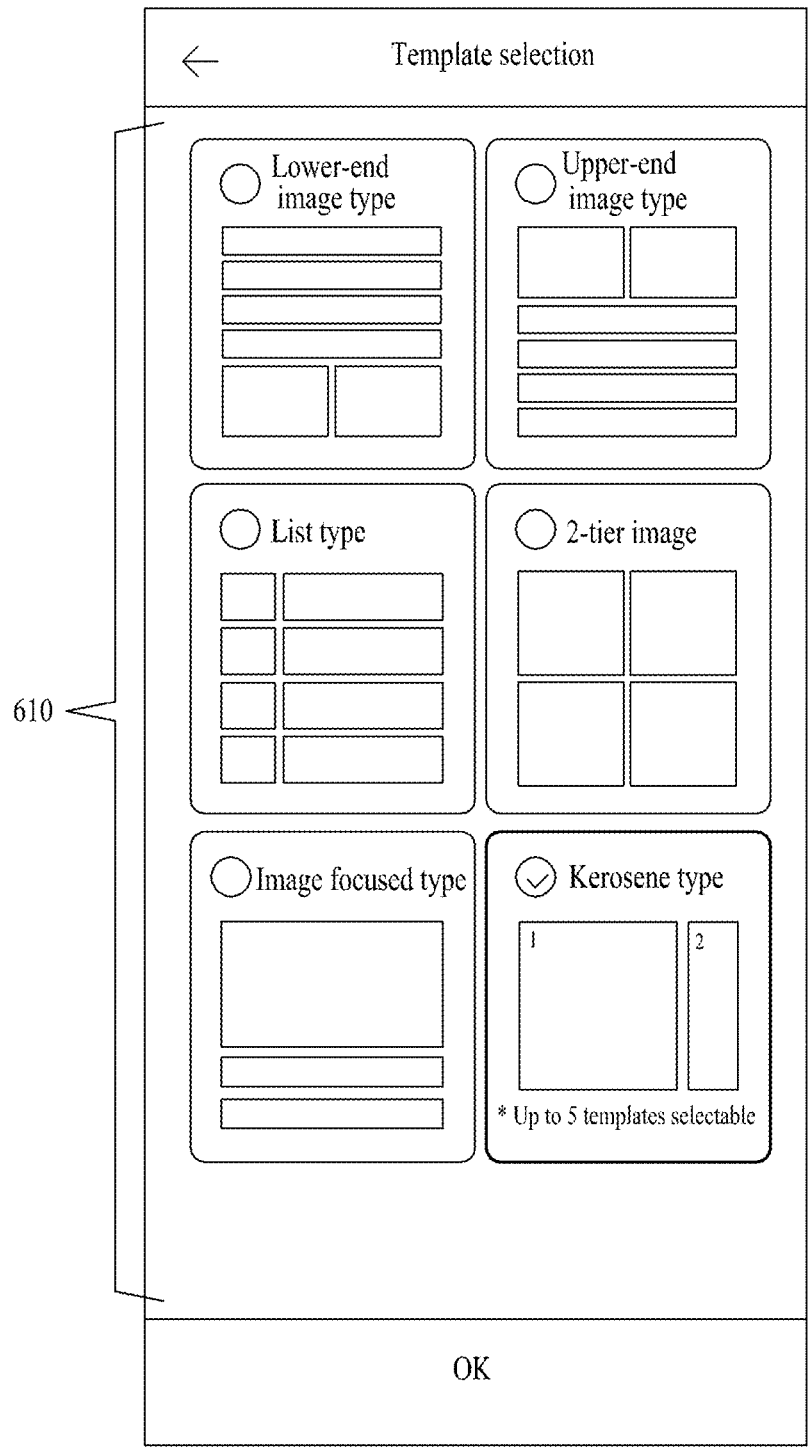

Referring to FIG. 6, when the administrator selects a cue card desired to be added from the cue card list 510, the processor 220 provides a template selection interface screen 600 for selecting a template. The processor 220 may provide a template list 610 including templates in different formats selectable for each cue card through the template selection interface screen 600. At least one template for arranging a content set according to a type of a cue card may be provided. A template selection process may be omitted for a cue card having a template in a single fixed format.

Figure 7:
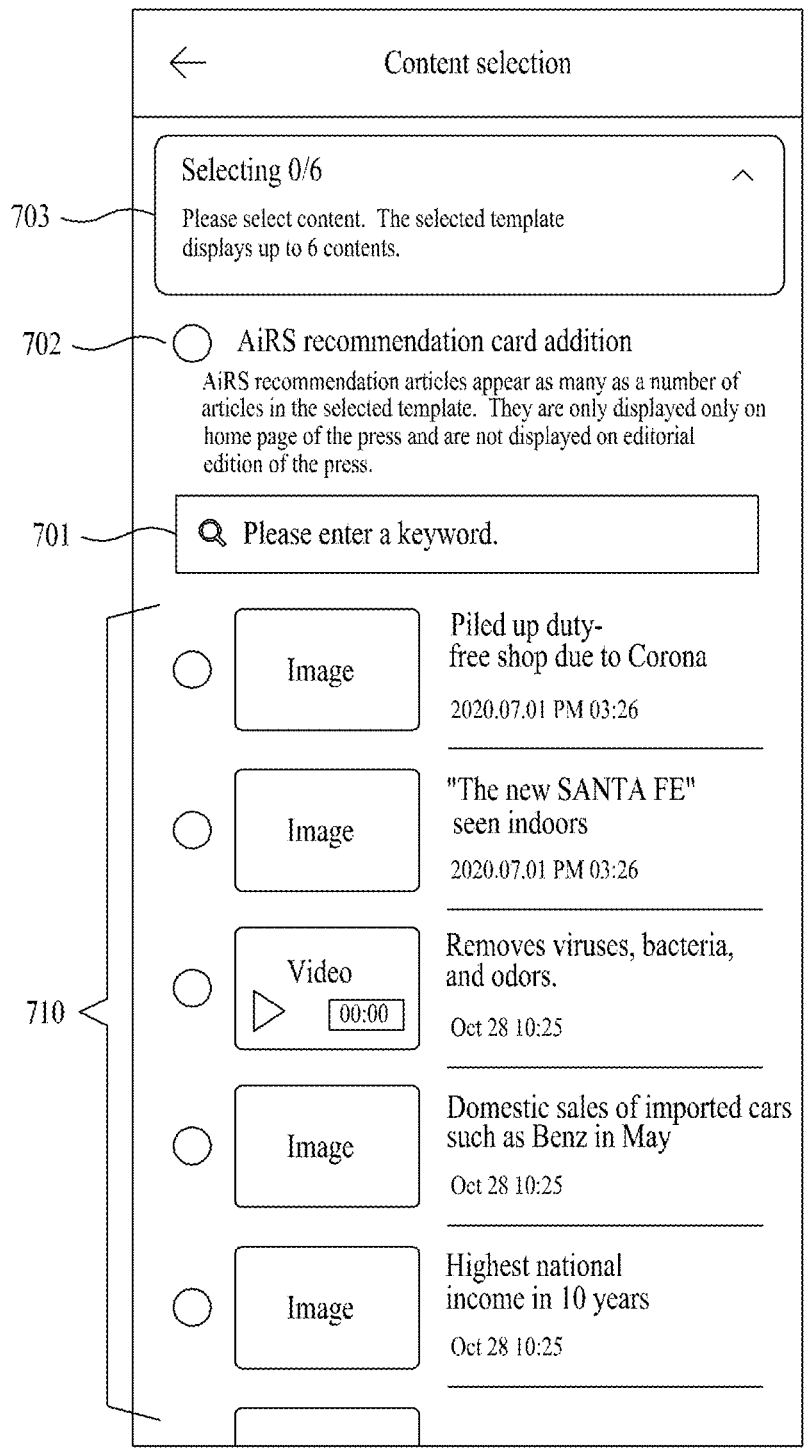

Referring to FIG. 7, in response to a selection on a template from the template list 610, the processor 220 provides a content selectin interface screen 700 for selecting content. The processor 220 provides a content list 710 for selecting a content set to be arranged in a cue card through the content selection interface screen 700. The content list 710 may include the entire content pools of the content provider or a content pool corresponding to a type of a cue card selected by the administrator and may include an interface for inputting a user selection for each content. The content selection interface screen 700 may include a search interface 701 for retrieving content from the content list 710 using a keyword and a recommendation interface 702 for requesting a content recommendation through an artificial intelligence (AI)-based recommendation system.

Figure 8:
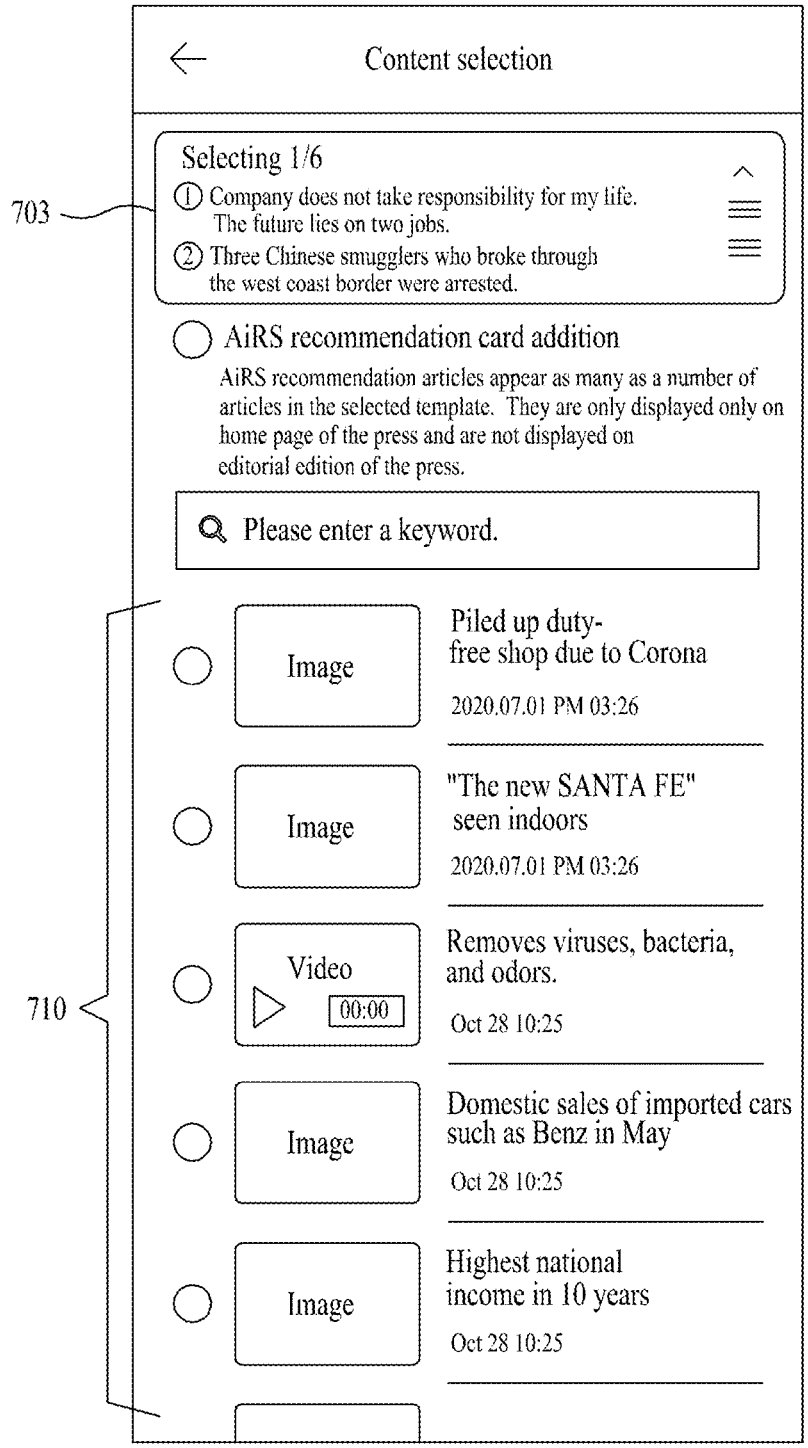

The administrator may select content to be arranged on a cue card from the content list 710 or may select the content through a search using the search interface 701. Referring to FIG. 8, the processor 220 may sort and display contents selected from the content list 710 on a selection list 703 of the content selection interface screen 700 in selection order.

Figure 9:
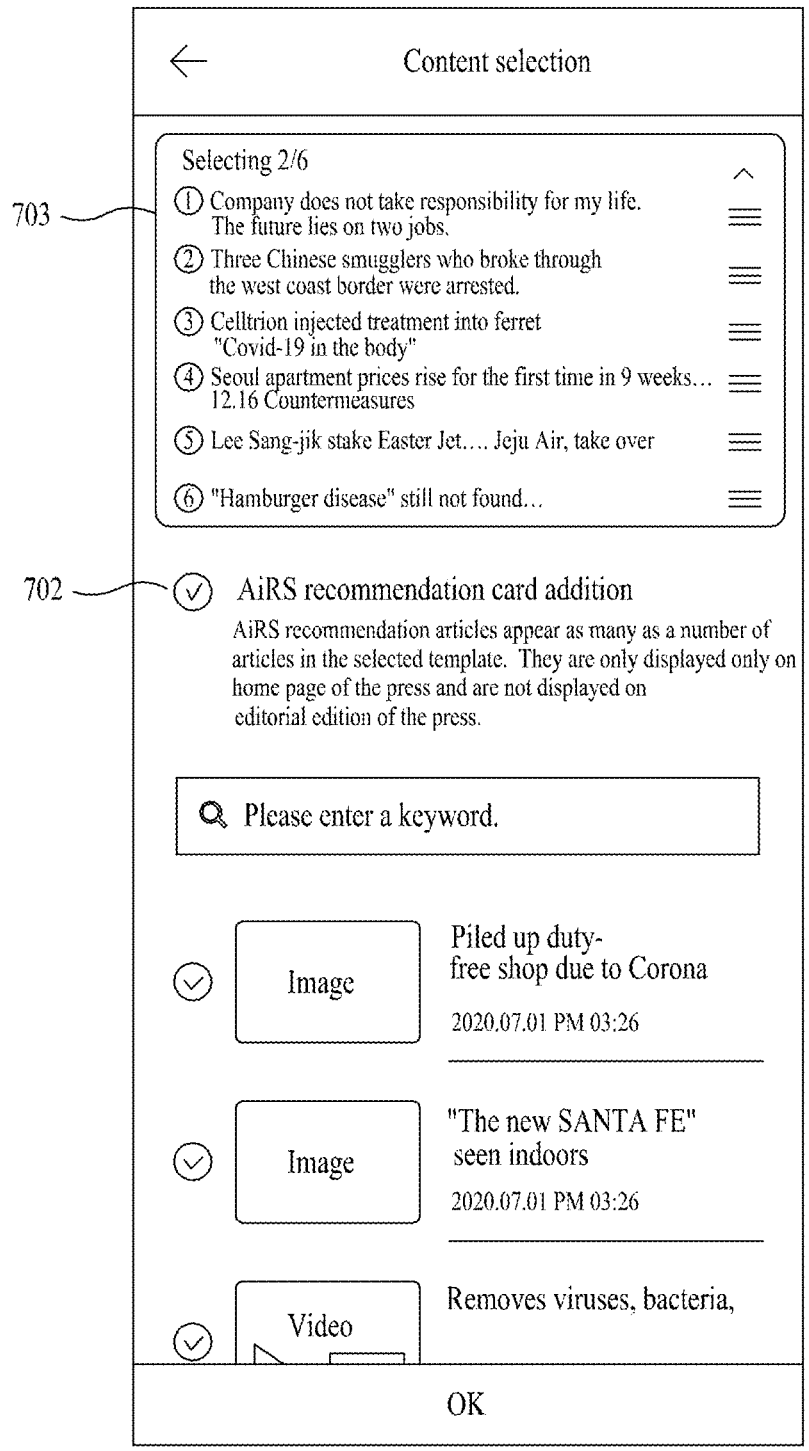

In addition to a scheme in which the administrator directly selects content, the processor 220 may request the content recommendation through the recommendation interface 702. Referring to FIG. 9, when the administrator requests the content recommendation through the recommendation interface 702 on the content selection interface screen 700, the processor 220 may automatically add a recommendation content set based on a content consumption pattern of users to the selection list 703.

The administrator may directly select the entire content set desired to add to a cue card or may request content recommendation to automatically configure a recommendation content set. In some example embodiments, the administrator may directly select a portion of the content set desired to be arranged on the cue card and may request a remaining thereof through content recommendation to configure the recommendation content.

The content selection interface screen 700 may further include an interface capable of adjusting order of content included in the selection list 703. For example, when content is selected from the selection list 703 and moved to a desired position, order of the content may be automatically changed. The administrator may select a content set that the administrator desires to arrange on a cue card and then may adjust order of content as desired order in the selection list 703.

Figure 10:
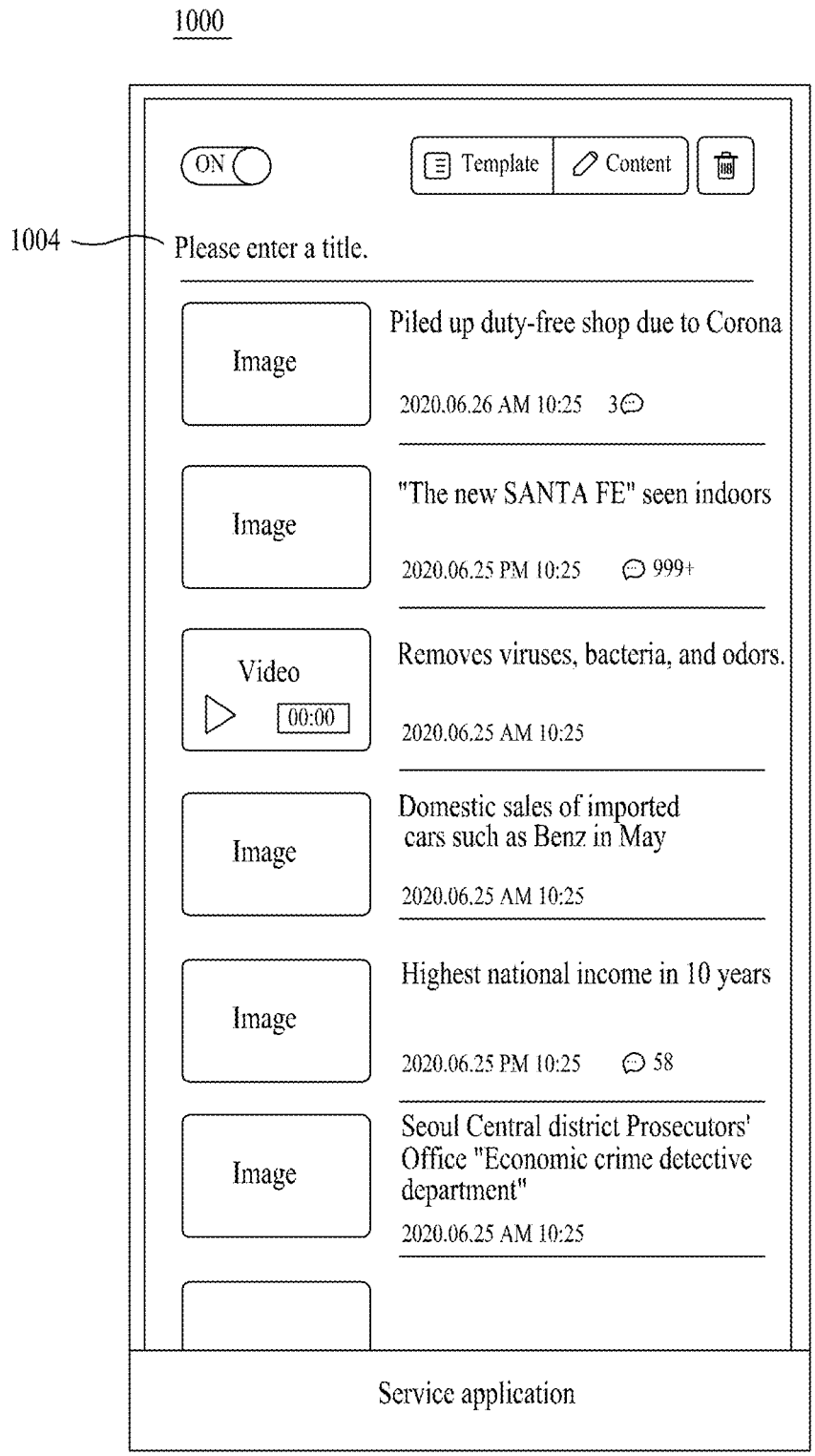

Referring to FIG. 10, when selection of a content set is completed through the content selection interface screen 700 according to a type of the cue card, the processor 220 may provide a cue card editing screen 1000 including an interface 1004 for modifying a cue card title. In the case of a cue card having a manual editing element for a title, the processor 220 may provide the interface 1004 for modifying the cue card through the cue card editing screen 1000 in addition to selection of the content set.

Figure 11:
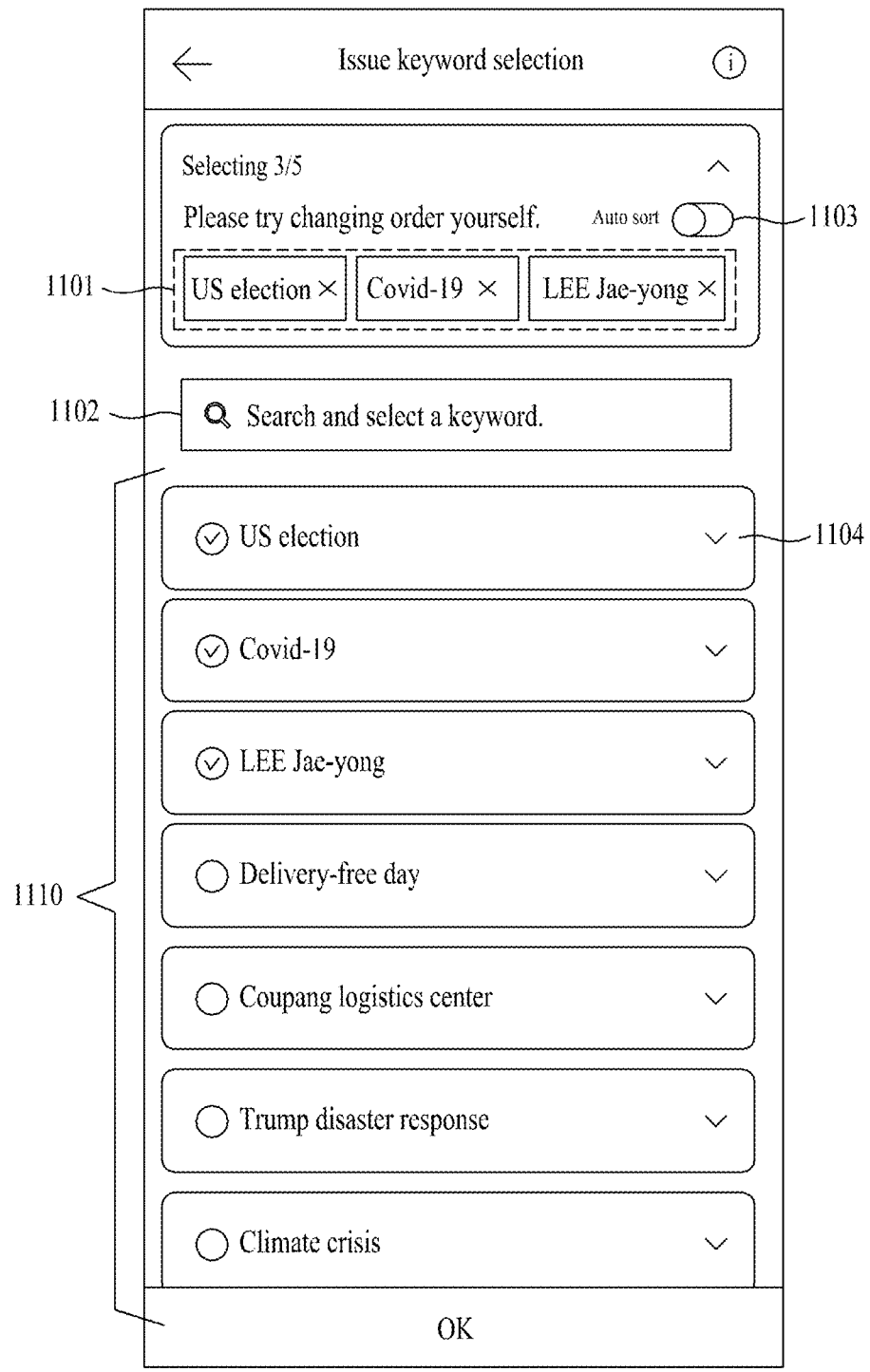

Referring to FIG. 11, when the administrator selects the keyword cue card 502 from the cue card list 510 of the cue card selection interface screen 500 of FIG. 5, the processor 220 provides a keyword selection interface screen 1100 for selecting a keyword instead of performing a process of selecting a content set. For example, the processor 220 may provide an issue keyword list 1110 including issue keywords corresponding to a sudden increase in a number of runtime searches through the keyword selection interface screen 1100.

When the administrator selects at least one keyword from the issue keyword list 1110, the processor 220 may automatically select a content set including the selected keyword or a content set of a type associated with the selected keyword as a content set that the administrator desires to arrange on the cue card.

The keyword selection interface screen 1100 may further include a selection list 1101 that includes a keyword selected from the issue keyword list 1110 and a search interface 1102 for searching for a keyword from the issue keyword list 1110.

In selecting a content set that the administrator desires to arrange on a cue card, a plurality of keywords may be included in the selection list 1101. In this case, content related to a corresponding keyword may be selected by the same weight for each keyword. As another example, if a plurality of keywords is included in the selection list 1101, a content selection weight may be determined based on keyword order. For example, when the administrator selects three keywords, a content set may be configured to include content of a first keyword by 50%, content of a second keyword by 30%, and content of a third keyword by 20%.

When a content selection weight is differently determined based on keyword order, the keyword selection interface screen 1100 may further include an interface 1103 capable of automatically arranging keyword order of the selection list 1101 in update order of issue keywords or directly chanting order by the administrator.

The keyword selection interface screen 1100 may further include a view more interface 1104 for verifying content related to a corresponding keyword for each keyword included in the issue keyword list 1110.

Figure 12:
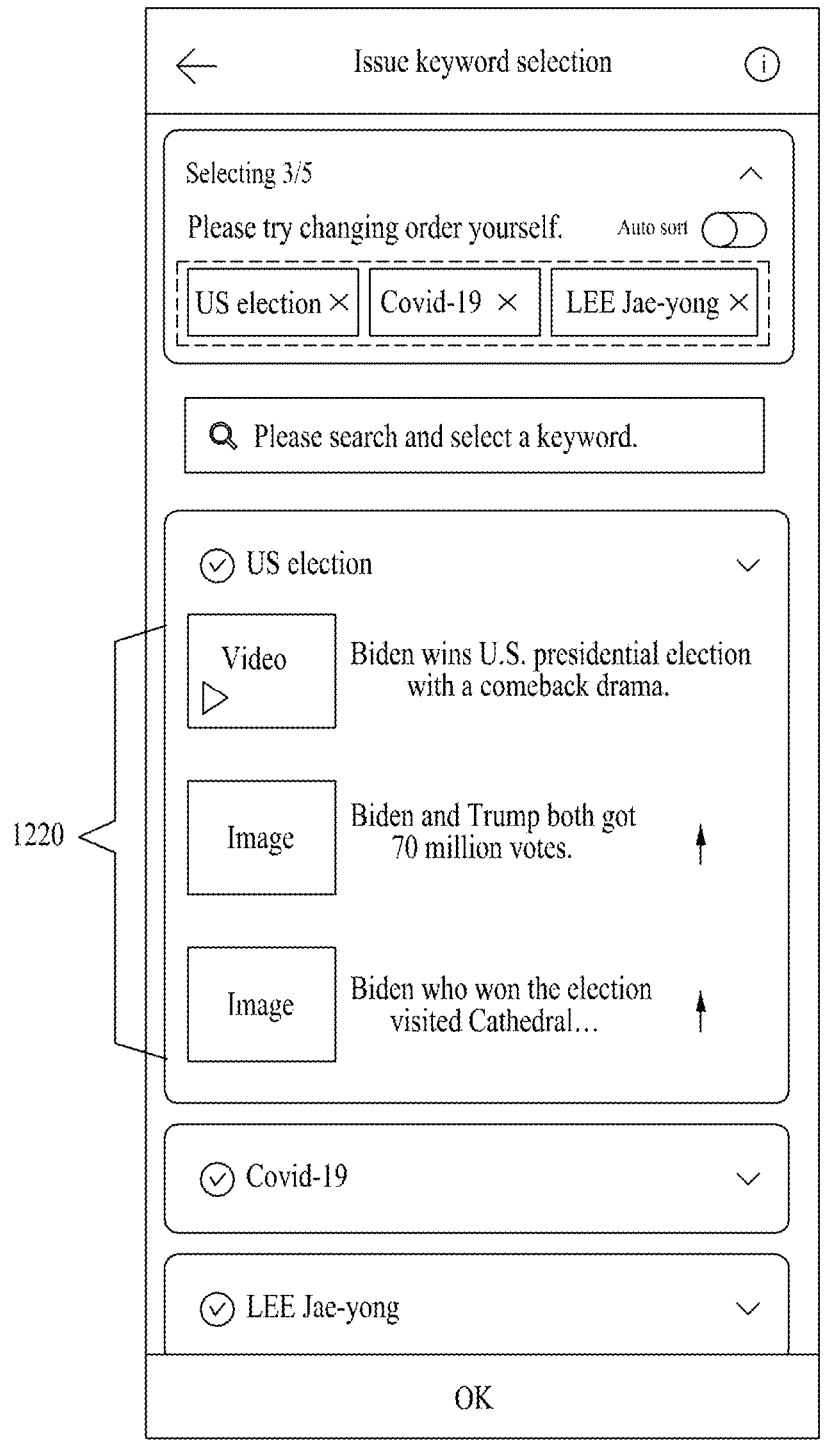

Referring to FIG. 12, when the administrator selects the view more interface 1104 for a specific keyword from the issue keyword list 1110, the processor 220 may provide a related content list 1220 that includes contents related to a corresponding keyword. The administrator may verify related content of each keyword in a process of selecting a keyword to add the keyword cue card 502.

Figure 13:
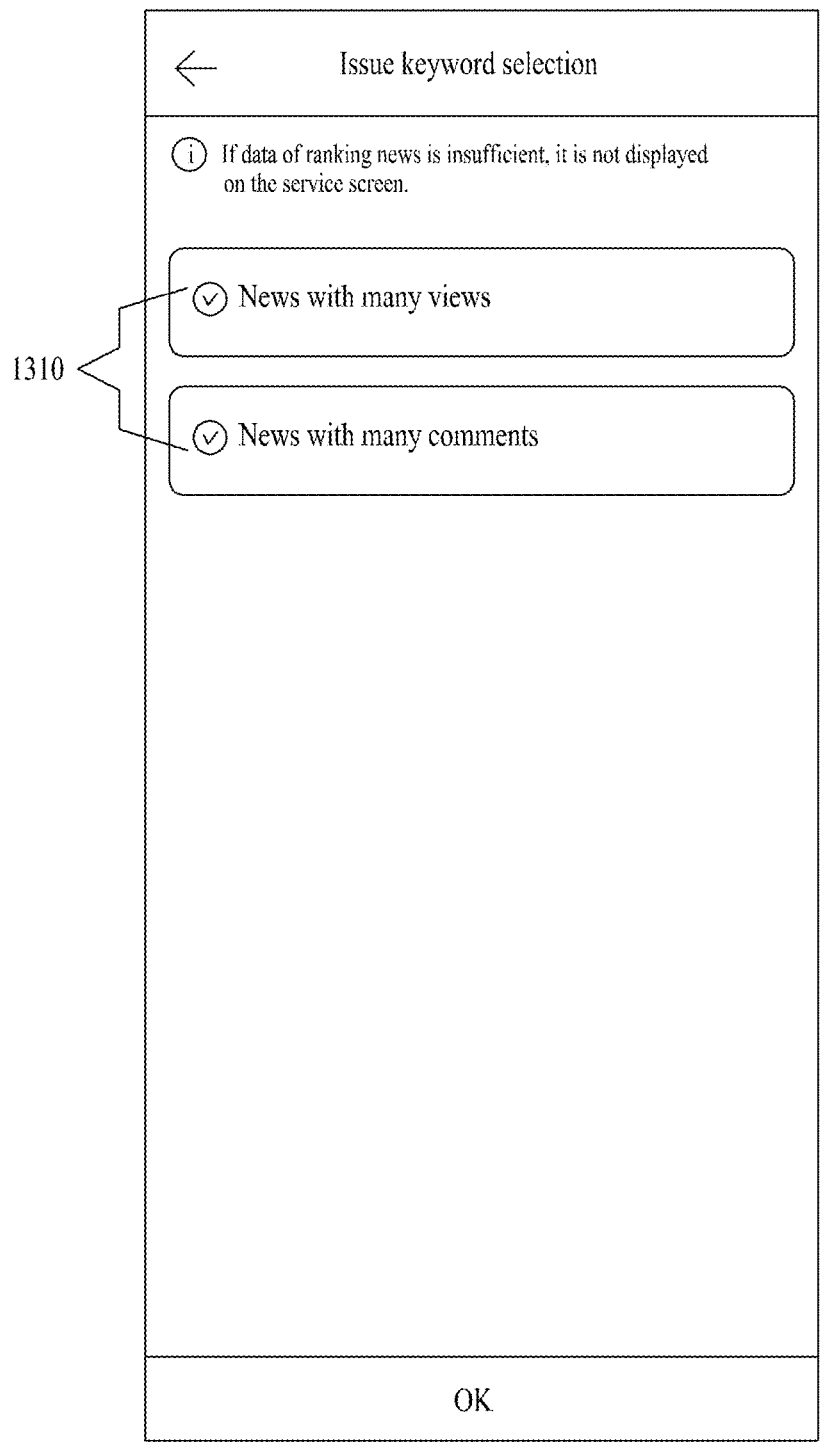

Referring to FIG. 13, when the administrator selects the ranking cue card 503 from the cue card list 510 of the cue card selection interface screen 500 of FIG. 5, the processor 220 provides a ranking data selection interface screen 1300 for selecting ranking data instead of performing a process of selecting a content set. The processor 220 provides an aggregation criterion list 1310 including aggregation criteria for determining a ranking of content through the ranking data selection interface screen 1300.

The processor 220 may automatically select a content set aggregated based on a criterion selected by the administrator from the aggregation criterion list 1310 as a content set that the administrator desires to arrange on a cue card. In the case of an aggregation criterion list 1310, a duplicate selection is possible and a content set aggregated based on a corresponding criterion may be arranged on the cue card for each aggregation criterion selected by the administrator.

The processor 220 may display a cue card added by the administrator on at least one service area and may automatically change a position of the added cue card to make it possible to increase or maximize user consumption. By analyzing content consumption propensity of each user according to a time or a day of week in which content is consumed and a content production cycle, a content consumption pattern of all users may be learned through a machine learning model. An admin tool for content arrangement may include an automatic cue card arrangement function. When the administrator selects the automatic cue card arrangement function, the processor 220 may automatically change a position of the cue card to make it possible to increase or maximize user consumption based on a machine learning result for the content consumption pattern of the entire users. For example, a cue card including headline news may be provided above other cue cards from 7 to 9 o'clock and, after that, a position of the cue card may be moved below other cue cards.

The admin tool for content arrangement may include an automatic cue card termination function for automatically terminating displaying of a cue card added by the administrator. When the administrator selects the automatic cue card termination function, the processor 220 may automatically terminate displaying of a corresponding cue card based on a content display time, a reduction in a consumption amount, and a total consumption status of an individual user for each cue card.

The admin tool for content arrangement may include an AB test function capable of experimenting content consumption of a user according to addition and arrangement of a cue card. The administrator may select a cue card and arrangement to be tested and may set an experimental condition that includes a characteristic (e.g., an age and a gender) of a target to be displayed and a number of persons, and an experiment duration. Therefore, the processor 220 may perform an AB test under the experimental condition set by the administrator for the cue card and the arrangement selected by the administrator and may provide a result report according to the AB test to the corresponding administrator.

According to some example embodiments, it is possible to produce a content set in a card unit by arranging contents using a card-type dedicated object for content arrangement and to display the content set produced in the card unit on a plurality of service areas. Further, according to some example embodiments, it is possible to reduce or minimize editing effort of an administrator and to arrange desired or optimized contents by providing an object including an automatic editing element as a dedicated object for content arrangement.

According to some example embodiments, abstraction of data may be performed with respect to external data in various formats, such as articles, blogs, posts, etc., inside a platform. In other words, main content of original content, for example, a type, a title, and a body of the content to data may be converted in a common format, for example, XML, JSON, HTML+ CSS, etc. Accordingly, the main content converted in a common format may be easily rendered in various display areas of the Internet services, without going through a different conversion process for each original content. Thus, computing resources may be substantially reduced, thereby enabling relatively fast display of the main content on various display areas of the Internet services.

The systems or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A content arrangement method performed by a computer apparatus comprising at least one processor configured to execute computer-readable instructions included in a memory, the content arrangement method comprising:

by the at least one processor, providing a cue card list that is a card-type dedicated object for content arrangement on a cue card selection interface screen, the cue card list including a plurality of cue cards having different shapes and editing elements, the cue cards each including at least one editing element associated with content arrangement, the cue cards further including at least one different editing element for each of the cue cards;

providing a template selection interface screen including one or more templates corresponding a cue card, in response to a selection of the cue card from among the plurality of cue cards on the cue card selection interface screen;

providing a content selection interface screen including a list of contents, in response to a selection of a template from among the one or more templates on the template selection interface screen; and arranging one or more contents selected from the list of contents on the content selection interface screen, in the selected template.

2. The content arrangement method of claim 1, wherein the cue card includes at least one editing element associated with content arrangement.

3. The content arrangement method of claim 1, wherein the cue card includes at least one template for content arrangement according to a type of the cue card.

4. The content arrangement method of claim 1, wherein the arranging comprises mapping the one or more contents to the cue card, the one or more contents having been selected based on a content consumption pattern of each user for each user using an Internet service according to a type of the cue card.

5. The content arrangement method of claim 1, wherein the arranging comprises mapping the one or more contents to the cue card, the one or more contents having been selected based on ranking data by content consumption of all users using an Internet service according to a type of the cue card.

6. The content arrangement method of claim 1, wherein the arranging comprises mapping the one or more contents to the cue card, the one or more contents associated with a keyword input or selected by an administrator according to a type of the cue card.

7. The content arrangement method of claim 1, wherein the arranging comprises:
converting content provided from a content provider to data in a common format; and
mapping data of each content included in the one or more contents to the template of the cue card.

8. The content arrangement method of claim 1, further comprising:
by the at least one processor,
displaying the cue card in which the one or more contents are arranged on at least one service area.

9. The content arrangement method of claim 8, further comprising:
by the at least one processor,
changing a position of the cue card that is displayed on the service area based on a content consumption pattern of all service users.

10. The content arrangement method of claim 8, further comprising:
by the at least one processor,
terminating displaying of the cue card based on at least one of a content display time, a content consumption status, and a content consumption amount for the cue card that is displayed on the service area.

11. The content arrangement method of claim 1, further comprising:
by the at least one processor,
providing an AB test function for experimenting content consumption by setting an experimental condition, the experimental condition including a target characteristic for the cue card in which the one or more contents are arranged.

12. A non-transitory computer-readable record medium storing instructions that when executed by a processor, cause a computer apparatus to run the content arrangement method of claim 1.

13. A computer apparatus comprising:
at least one processor configured to execute computer-readable instructions included in a memory, the at least one processor configured to cause the computer apparatus to,
provide a cue card list that is a card-type dedicated object for content arrangement on a cue card selection interface screen, the cue card list including a plurality of cue cards having different shapes and editing elements, the cue cards each including at least one editing element associated with content arrangement, the cue cards further including at least one different editing element for each of the cue cards,
provide a template selection interface screen including one or more templates corresponding a cue card, in response to a selection of the cue card from among the plurality of cue cards on the cue card selection interface screen,
provide a content selection interface screen including a list of contents, in response to a selection of a template from among the one or more templates on the template selection interface screen, and
arrange one or more contents selected from the list of contents on the content selection interface screen, in the selected template.

14. The computer apparatus of claim 13, wherein the cue card includes at least one editing element associated with content arrangement.

15. The computer apparatus of claim 13, wherein the at least one processor is further configured to cause the computer apparatus to map the one or more contents to the cue card, the one or more contents having been selected based on a content consumption pattern of each user for each user using an Internet service according to a type of the cue card.

16. The computer apparatus of claim 13, wherein the at least one processor is further configured to cause the computer apparatus to map, the one or more contents to the cue card, the one or more contents having been selected based on ranking data by content consumption of all users using an Internet service according to a type of the cue card.

17. The computer apparatus of claim 13, wherein the at least one processor is further configured to cause the computer apparatus to map the one or more contents to the cue card, the cue card associated with a keyword input or selected by an administrator according to a type of the cue card.

18. The computer apparatus of claim 13, wherein the at least one processor is further configured to cause the computer apparatus to display the cue card in which the one or more contents are arranged on at least one service area.

19. The computer apparatus of claim 18, wherein the at least one processor is further configured to cause the computer apparatus to change a position of the cue card that is displayed on the service area based on a content consumption pattern of all service users.

20. The computer apparatus of claim 18, wherein the at least one processor is further configured to cause the computer apparatus to provide an AB test function for experimenting content consumption by setting an experimental condition, the experimental condition including a target characteristic for the cue card in which the one or more contents are arranged.

* * * * *